US008584227B2

(12) United States Patent
Abzarian et al.

(10) Patent No.: US 8,584,227 B2
(45) Date of Patent: Nov. 12, 2013

(54) FIREWALL WITH POLICY HINTS

(75) Inventors: David Abzarian, Kirkland, WA (US); Gerardo Diaz Cuellar, Redmond, WA (US); Satheesh S. Dabbiru, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1537 days.

(21) Appl. No.: 11/801,211

(22) Filed: May 9, 2007

(65) Prior Publication Data

US 2008/0282314 A1 Nov. 13, 2008

(51) Int. Cl.
H04L 29/06 (2006.01)

(52) U.S. Cl.
USPC .............................. 726/13; 713/153

(58) Field of Classification Search
None
See application file for complete search history.

(56) References Cited

U.S. PATENT DOCUMENTS

| | | | |
|---|---|---|---|
| 5,968,176 A | 10/1999 | Nessett et al. | |
| 7,016,980 B1 | 3/2006 | Mayer et al. | |
| 7,284,267 B1 * | 10/2007 | McArdle et al. | 726/11 |
| 7,877,795 B2 * | 1/2011 | Aaron | 726/11 |
| 2002/0138726 A1 | 9/2002 | Sames et al. | |
| 2004/0003290 A1 * | 1/2004 | Malcolm | 713/201 |
| 2004/0103321 A1 | 5/2004 | Wesinger, Jr. et al. | |
| 2004/0268150 A1 | 12/2004 | Aaron | |
| 2005/0138416 A1 | 6/2005 | Qian et al. | |
| 2005/0204402 A1 | 9/2005 | Turley et al. | |
| 2005/0240990 A1 * | 10/2005 | Trutner et al. | 726/11 |
| 2005/0268331 A1 | 12/2005 | Le et al. | |
| 2006/0129808 A1 | 6/2006 | Koti et al. | |
| 2006/0248580 A1 | 11/2006 | Fulp et al. | |
| 2006/0288409 A1 | 12/2006 | Bartal et al. | |

OTHER PUBLICATIONS

Ehab Al-Shaer et al., "Firewall Policy Advisor for Anomaly Discovery and Rule Editing" *Multimedia Networking Research Laboratory School of Computer Science, TIS,* 14 pages.

Almut Herzogl et al., "Usability and Security of Personal Firewalls", *Dept. of Computer and Information Sciences, Linkopings universitet,* Sweden, Jan. 19, 2007, pp. 1-15.

Ehab S. Al-Shaer et al., "Design and Implementation of Firewall Policy Advisor Tools", *Multimedia Networking Research Laboratory School of Computer Science, TIS,* pp. 2-21.

* cited by examiner

*Primary Examiner* — Gilberto Barron, Jr.
*Assistant Examiner* — Izunna Okeke
(74) *Attorney, Agent, or Firm* — Chin IP, PLLC; David Chin

(57) ABSTRACT

A firewall helps a user make a decision regarding network access for an application executing on a computing device by providing "hints" to the user about an appropriate network access policy. If at least one previously set firewall policy for the application exists in a context different from a current context, the user may be presented with information based on a previously set firewall policy. The information may be prioritized based on a source of the previously set firewall policy and other factors, to provide the user with a hint that facilitates making the decision appropriate in the current context. A programming interface to the firewall allows third party applications to specify a format in which hints are provided to the user.

20 Claims, 11 Drawing Sheets

| Profile | Store | State | Action Marker | Restrictions | |
|---|---|---|---|---|---|
| Domain | Group Policy | Enabled | Allow | Local Port = 80 | ... |
| Public | Group Policy | Enabled | Block | | ... |
| Domain | Local Policy | Disabled | Allow | Local Subnet | ... |
| Public | Dynamic Policy | Disabled | Block | | ... |

FIG. 5

FIREWALL WITH POLICY HINTS

BACKGROUND OF INVENTION

Computers are widely used in both business and personal settings. Frequently, the utility of a computer is greatly enhanced by its ability to send or access data over a network. Unfortunately, expanding the functionality of a computer by connecting it with devices operated by other legitimate users also creates the risks that the computer will become connected to devices operated by third parties who, either maliciously or inadvertently may send message over the network that cause damage to the computer or the data that it stores. Alternatively, using the network, a third party may improperly gain access to information stored on the computer that was intended to be secret. In these scenarios, rather than enabling desired functionality, the network connection poses a security risk for a computer and its user. To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of policies defining characteristics of network messages that either should pass through the firewall or that should be blocked. Because different levels of communication may be appropriate depending on the origin or destination of messages, firewall policies may be provided for each application that executes on a computing device and communicates over a network.

Further, different security settings and therefore different firewall policies may be appropriate in different operating contexts. To accommodate different firewall settings in different network contexts, policies may be categorized into profiles based on the context in which they are to be used. It is known to provide a profile for use when a computer is domain-joined to a network and another policy store, which may contain different policies, for use when the computer is not domain-joined.

Further, firewall policies may be obtained from different sources. Some policies may be set by a user, which requires the user to make a determination of whether an application should be allowed or blocked from network access. For domain-joined computers, policies may be set by a domain administrator. To hold policies set by the domain administrator, a group policy store may be provided. A local policy store may hold policies set by a user. A dynamic policy store may be provided for temporary policies.

When a decision is required to allow or block access, a firewall may consult the profiles in the policy stores to identify an application policy. If multiple applicable policies are present, an order of priority, based on the source of the applicable policies, may be used to pick one. If no applicable policy is available in a current context, a user may be prompted to make a decision which is then used to generate a policy.

SUMMARY OF INVENTION

To aid a user set a firewall policy to control network access for an application, the user may be presented with information on a previously set firewall policy relating to network access provided to the application in a different context. This information may act as a "hint" for setting a firewall policy. Thus, the user experience may be improved by assisting the user in making a more informed decision regarding the application in a current context.

Firewall policies may be set in multiple ways and by different entities. If multiple previously set firewall policies exist for an application in one or more contexts different from the current context for which a decision is requested, previously set firewall policies may be prioritized to identify a previously set policy most useful as a hint to help the user make a decision applicable to the current context.

The hints may be provided to the user in different representation formats. For example, a user interface requesting a user to make a decision may include the hints. However, a firewall providing hints to a user may communicate with third party applications that specify a representation of the hints. Thus, a functionality of the firewall can be extended by enabling it to provide hints displayed to users in formats specified by different third parties.

In one aspect, the invention provides a method of operating a computing device executing an application. The method comprises determining whether at least one previously set firewall policy for the application exists in a context different from a current context and presenting to user information based on the determination.

In another aspect, the invention provides a computer system having a graphical user interface for requesting a decision from a user regarding an application in conjunction with providing information to the user based on at least one previously set firewall policy for the application in a context different from a current context.

In yet another aspect, the invention provides a computer-readable medium having computer-executable components. The computer-readable medium comprises a plurality of policy stores, a firewall component, and a component for identifying information that is provided to a user based on determining whether at least one previously set firewall policy for the application exists in a context different from a current context.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a conceptual illustration of a data structure including information on policy stores according to some embodiments of the invention.

DETAILED DESCRIPTION

The inventors have appreciated that, if the user is presented with hints for setting a firewall policy, the user's experience can be improved and a more informed decision can be made by a user regarding a firewall policy for an application executed on a computing device. The hints may be based on a previously set firewall policy for the application that is applicable in a different context. Though the previously set policy may not be directly applicable in a context for which user input is requested for configuring a firewall, it may be adequate to determine a hint that eases the burden on the user in selecting an appropriate policy.

Previously set firewall policies may come from different sources. For example, the firewall policies may be defined automatically, manually, by a combination thereof, or in any other suitable way. The firewall policies may include restrictions. Furthermore, different firewall policies may exist for different contexts. Thus, the inventors have appreciated that it may be required to prioritize the firewall policies when selecting a previously set policy to use in providing hints to the user. For example, prior decisions made by a domain administrator (e.g., if a previously set firewall policy comprises a group policy) may take priority over prior decisions made by a user. The user equipped with more suitable hints may be able to make a more informed decision regarding the application.

The ability to provide hints may be used by third party applications. Therefore, a firewall according to some embodiments of the invention may include a programming interface through which the third party application can receive the hints for presentation to a user. The application may then present the hints in any suitable format and convey user input to the firewall.

Figure 1A:
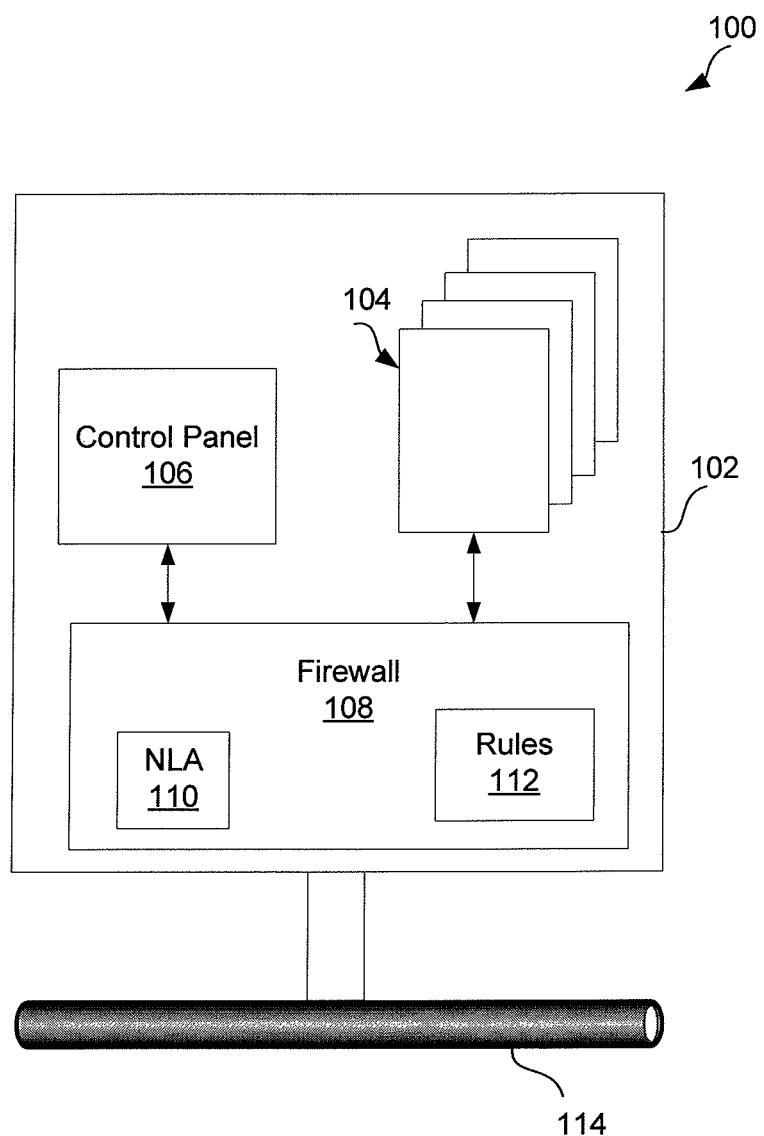
FIG. 1A is a schematic diagram illustrating a computer system including a firewall.

FIG. 1A is a schematic diagram illustrating a computer system 100 which comprises a computing device 102 including a firewall 108. The firewall 108 controls access of applications 104 executed on the computing device 102 to a network 114. The network 114 may be any suitable wireless or wired network. The firewall 108 may be implemented in software, hardware, or any suitable combination thereof. Furthermore, it may be installed on or otherwise associated with the computing device 102.

The firewall 108 controls network traffic comprising outbound and/or inbound network packets transmitted to and from a network 114. It should be appreciated that communications over the network 114 are referred to as network "packets" by way of example only and not to limit the scope of the invention, which may operate in connection with network messages of any type.

The firewall 108 operates by executing firewall policies implemented with sub-policies such as a set of rules 112, which can be either enabled or disabled. Disabled rules are rules that are currently not enforced by the firewall, but which can, at some point, become enabled. The rules 112 define actions that can be applied to packets to or from those applications.

As an example, if any of applications 104 executing on the computing device 102 tries to transmit messages to and/or receive messages from the network 114 (e.g., to contact or respond to a computing device on the network 114 different from the computing device 102), the firewall 108 can either allow or block application 104 from communicating messages over the network 114. Accordingly, if a message to or from an application is intercepted by the firewall 108 and the rules 112 include one or more matching rules for the application, the firewall 108 can determine how to proceed with processing the message.

To identify matching rules for an application, the firewall 108 consults existing firewall policies. Different firewall policies may apply to the application 104 depending on a current context of the computing device 102. The current context reflects a network location of the computing device 102 that indicates what type of the network 114 the application 104 is attempting to access. A network can be categorized into any suitable types. For example, there may be such underlying network categories as "domain" and "standard." The "domain" network type, for example, may be assigned to a network if the network has a domain controller.

The firewall 108 may include a component, shown by way of example only and not to limit the scope of the invention, as a network location awareness (NLA) component 110, which may obtain information on the type of the network 114. It should be appreciated that the NLA component 110 may be able to identify one or some of the possible network locations. The type of network to which computing device 102 is connected may define its context. Though, any suitable network characteristics or other factors may be used to define a context. If firewall policies are provided for different contexts, an applicable policy is selected for the current context.

If a firewall policy exists for an application in a current context, this policy may apply to the application. In this situation, a user is not requested to make a decision regarding the application. Alternatively, if no firewall policies exist for the application in the current context, a user may be presented with a graphical user interface or any other suitable component that enables requesting a decision regarding network access for the application in the current context. For this purpose, the computing device 102 may include a control panel 106 which is used to set and manage the firewall 108 and associated firewall policies. As discussed above, firewall policies may be set automatically, manually (e.g., by a domain administrator, a local administrator or other user with sufficient privileges to edit firewall policies) or in any other suitable way.

Figure 1B:
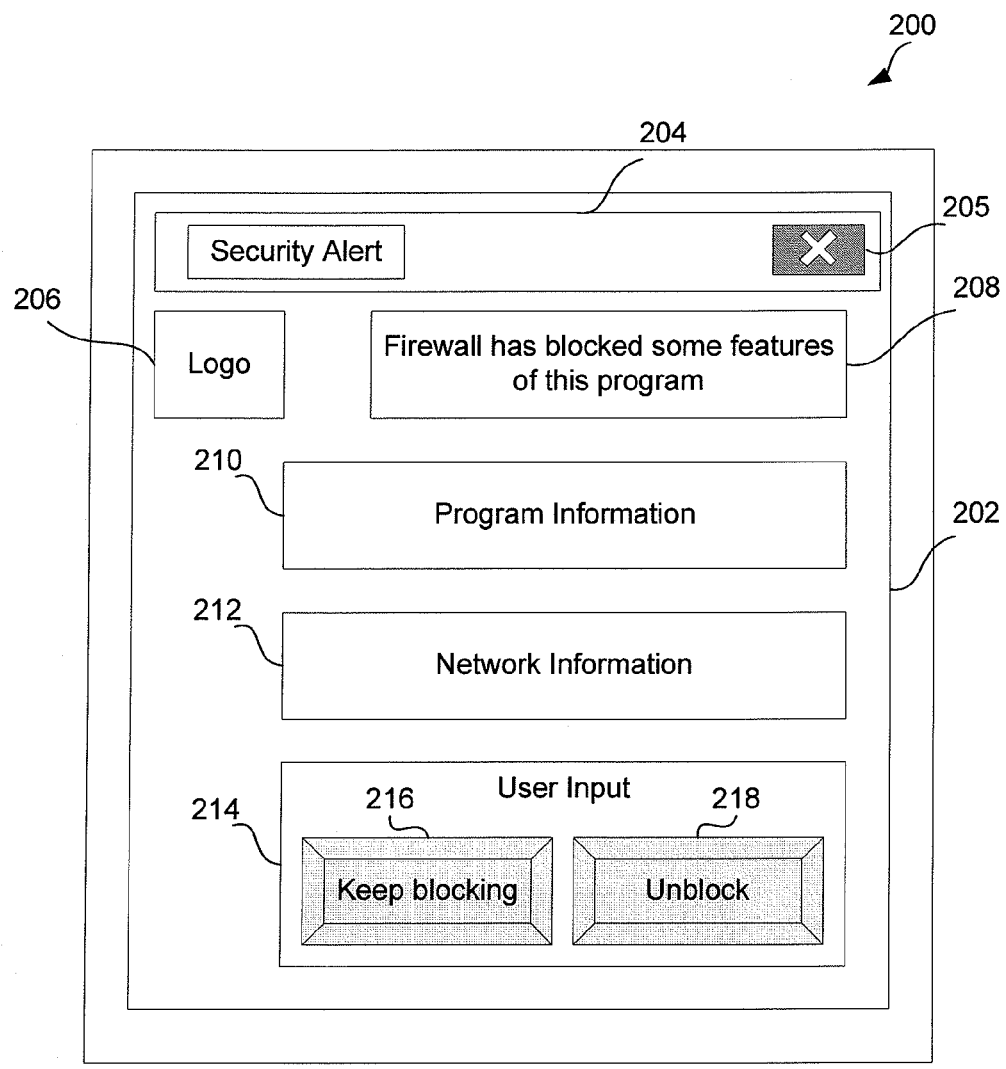
FIG. 1B is a schematic diagram illustrating a prior art graphical user interface provided to a user utilizing the computing device of FIG. 1A.

To either allow or block any of the applications 104 from accessing the network 114, a user may be presented with a graphical user interface such as, for example, a user interface 200 shown in FIG. 1B. The user interface 200 may include a dialog box 202 that requests a user input via a user input window 214, which can provide components of any suitable type to receive the user input. For example, buttons such as a "keep blocking" button 216 and an "unblock" button 218 may be included in the user input window 214. The user can also be presented with the information such as, for example, program information 210 which includes information on the application 104 for which a network access decision is requested, and network information 212 which may comprise a network category defined for the computing device and/or the current context.

The dialog box 202 may include a header 204 informing the user of a type of the dialog box presented to the user (e.g., a security alert dialog box as shown in FIG. 1B) and providing components such as, for example, a "close" button 205 and other suitable components extending functionality of the dialog box 202 that are not shown for simplicity of representation.

The dialog box 202 may include a logo 206 or any other components defining the application for which the dialog box 202 is presented. It should be appreciated that identity of the application 104 may be expressed in the dialog box 202 in any suitable way. In addition, a notification 208, such as, for example, "Firewall has blocked some features of this program" may be provided to the user to convey actions of the firewall to the user. Though the information presented in dialog box 202 may allow a user to specify a policy, a user may be overwhelmed by the requirement to make such a choice.

In embodiments of the invention, when a user is prompted to make a decision regarding network access for an application, the user may be provided with information reflecting, if available, prior decisions with respect to network access for the application in contexts different from a current context. This information provides a "hint" to the user. The prior decisions may have been made through information from any suitable sources (e.g., by a user, a domain administrator, any other suitable entity, or automatically). Accordingly, some embodiments of the invention provide a method to determine whether at least one previously set firewall policy for the application exists in a context different from a current context. The current context reflects configuration of the network which the applications accesses. If the at least one previously set firewall policy has been identified, the user may be provided with the above information in different forms, depending on properties, including priority considerations, of the at least one firewall policy.

Figure 2A:
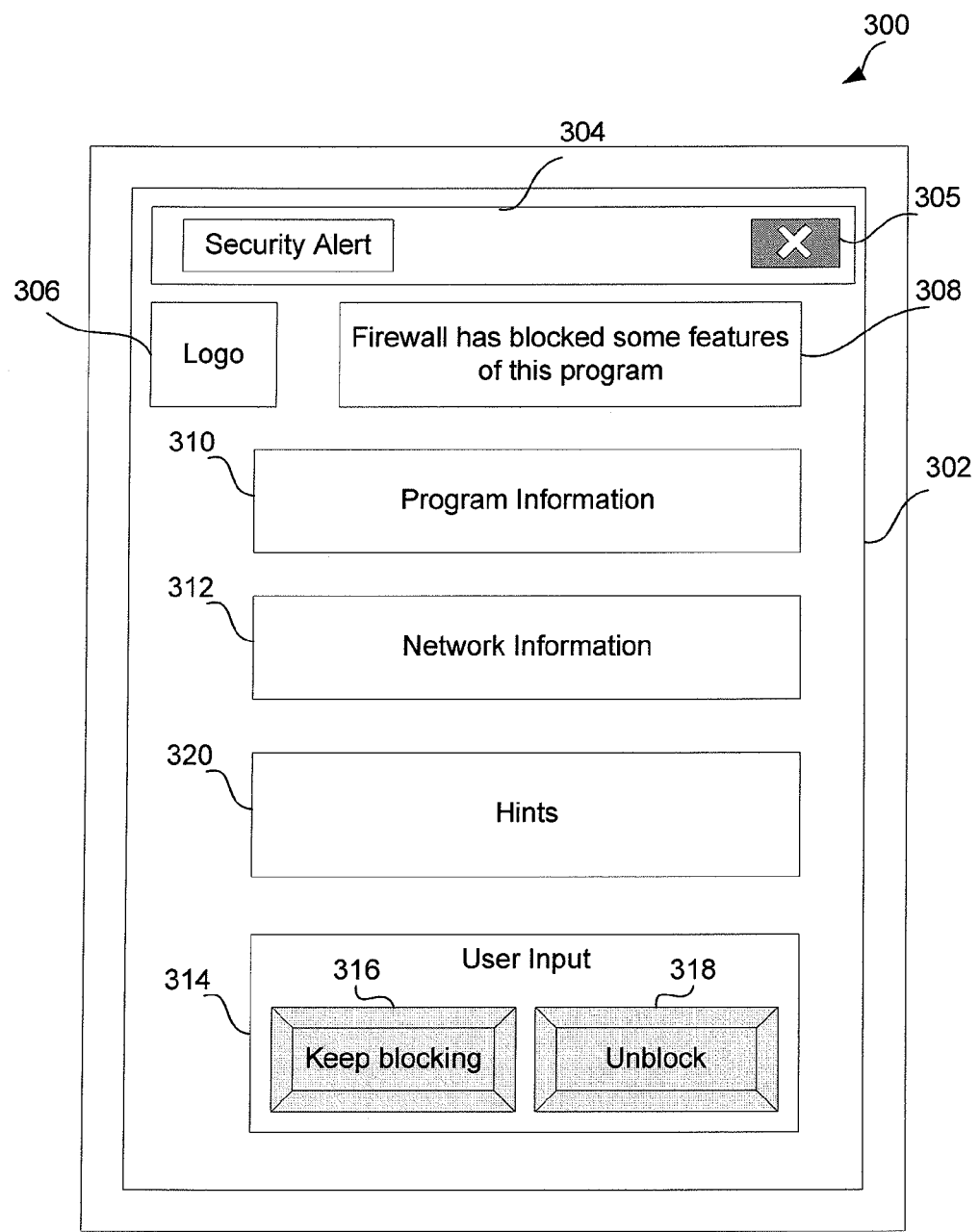
FIG. 2A is a schematic diagram illustrating a graphical user interface including hints provided to a user utilizing a computing device according to some embodiments of the invention.

FIG. 2A illustrates a user interface 300 including a dialog box 302 providing information to the user about a prior decision on network access for an application shown by way of example only and not to limit the scope of the invention as hints 320. All other components included in the dialog box 302 may be identical to the components included in the dialog box 202, which is indicated by using like numerals for like components. However, it should be appreciated that the information may be provided to the user via the user interface 300 in any suitable representation, including audible or visual formats or a combination thereof. Some embodiments of the invention provide a method to determine what particular information, given any available information, may be presented to the user and if some information may take priority over another, as discussed in more detail below.

Figure 2B:
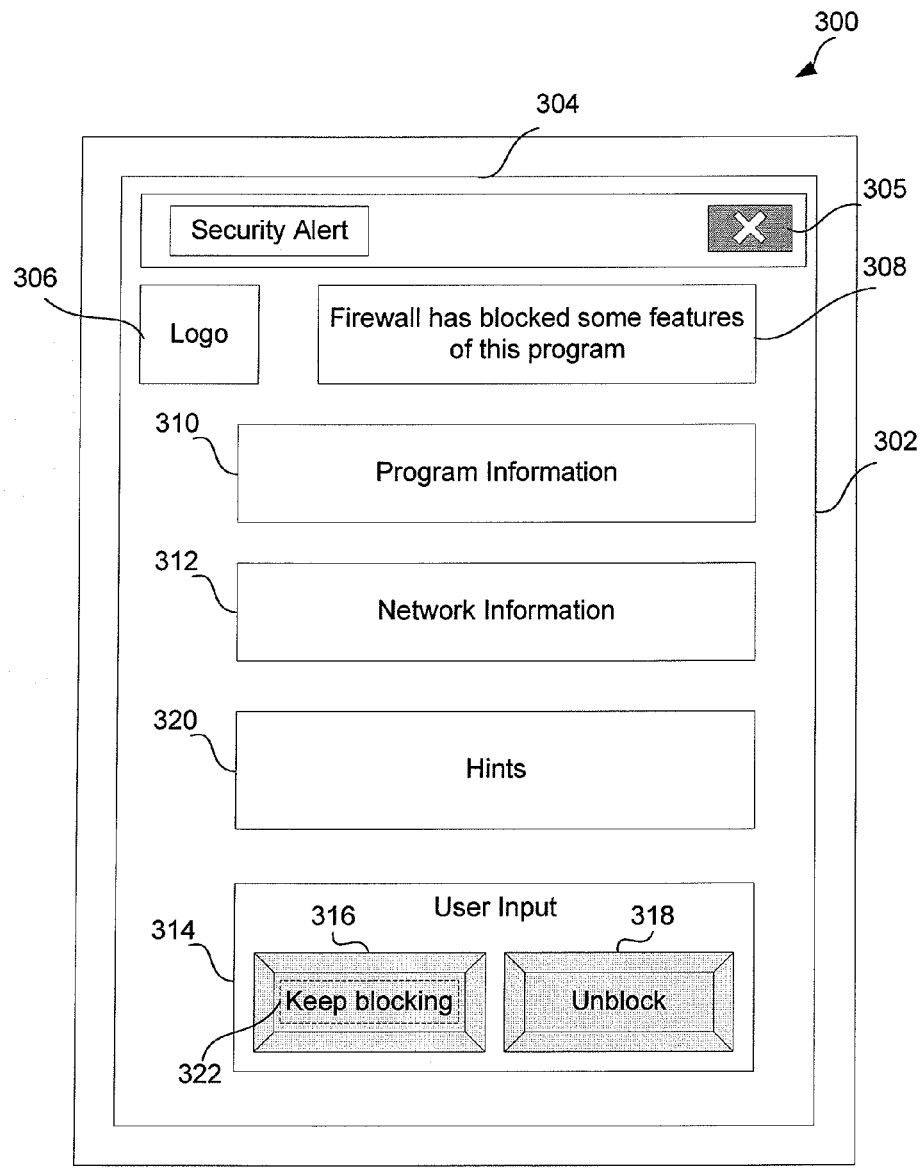
FIGS. 2B and 2C are schematic diagrams illustrating a graphical user interface including different types of hints provided to a user according to some embodiments of the invention.

The user interface may provide to a user a suggested action based on hint information, which may be presented as a focus. Accordingly, as shown in FIG. 2B, the "keep blocking" button 316 may have a focus on it as a type of a hint to the user indicating that, for security purposes, it may be reasonable to keep blocking the application blocked by the firewall (e.g., the firewall 108). As an alternative example, the focus may be set on the "unblock" button 318 as a suggestion to allow network access by the application.

Figure 2C:
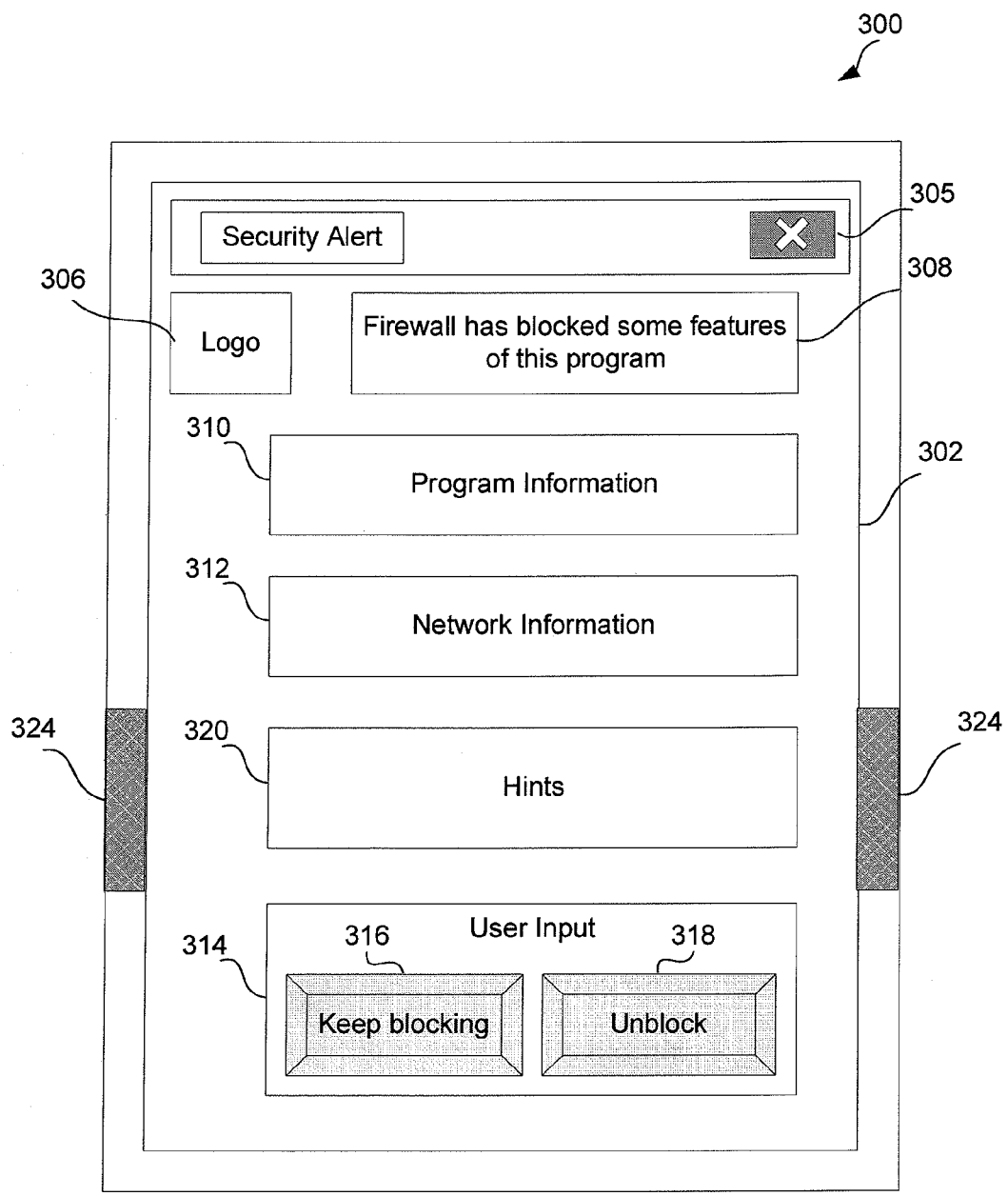

Furthermore, coloring may be used to convey a suggested action to the user. Therefore, as another type of a hint, an area around the hints 320, such as, for example, an area of the user interface 300 bordering the dialog box 302 may be presented in a color different from the color of the rest of the area of the user interface 300. An example of such visual representation is shown in FIG. 2C wherein areas 324 accentuate the hints 320, which may draw the user's attention to the dialog box 302 and, in particular, to the hints 320. Alternatively, the whole area of the user interface 300 surrounding the dialog box 302 can be enhanced using any suitable visual format. Different colors may be used to assist the user in apprehending what action is suggested to be taken. For example, red may indicate that an application is suggested to be blocked, while green may be used to inform the user that it may be appropriate to allows the application to access a network. Yellow may indicate, for example, that the application may be allowed to access the network, but some restrictions would be appropriate. An example of another type of a hint may be displaying whether rules matching the application are enabled or disabled.

In some embodiments of the invention, to provide the user with information (e.g., as the hints 320) regarding previously set firewall policies for an application (e.g., any of the applications 104), a determination may be made of whether the previously set firewall policies for the application exist in a context different from the current context. To carry out the determination, network profiles (e.g., a private, domain, public or any other network profile) may be examined. Different firewall policies may exist for different network profiles. Thus, applicable firewall policies may be located in one or more different policy stores which can reside in any suitable component of a computing device, for example, in the rules 112 within the firewall 108.

Figure 3:
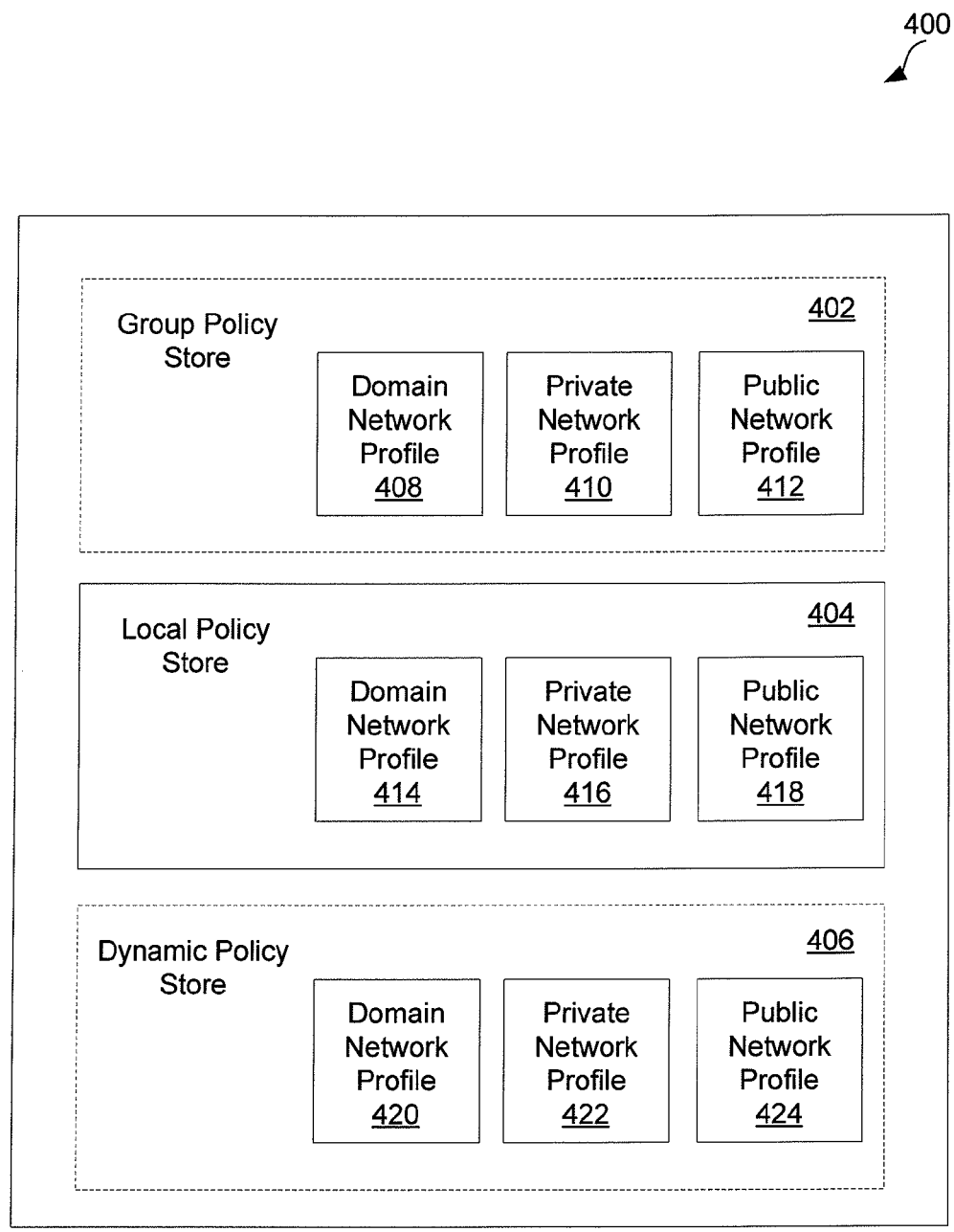
FIG. 3 is a sketch of a policy store architecture implemented in some embodiments of the invention.

FIG. 3 illustrates an exemplary data structure 400 that can be included in a computer-readable media in a computing device executing an application that attempts to access a network, according to some embodiments of the invention. The data structure 400 has multiple policy stores. Each of a group policy store 402, a local policy store 404, and a dynamic policy store 406 may include respective sets of firewall policies, here, organized based on the source of the policies. Each policy store may have separate profiles for different contexts. Thus, the policy stores may include firewall policies organized into firewall policies for a domain network profile (408, 414, and 420, respectively), a private network profile (410, 416, and 422, respectively), and a public network profile (412, 418, and 424, respectively).

Firewall policies for a domain network profile may be used to protect security of a computing device if the computing device is domain joined (i.e., if the computing device can authenticate with a network device, such as, for example, a domain controller). Such firewall policies apply, for example, when a user operates the computing device on a corporate network. Firewall policies for a private network profile may apply when a computing device operates on a network identified as a private network. In any other circumstances, in this example, firewall policies for a public or domain profile may apply. It should be appreciated that the above three types of network profiles are given by way of example only and other network profiles may be used to differentiate among different network locations.

In the example illustrated, firewall policies in the group policy store 402 may be set by a domain administrator, while firewall policies in the local policy store 404 and the dynamic policy store 406 may be set by the user. As another source, firewall policies included in any of the policy store can be downloaded from any suitable location. The dynamic policy store 406 may include firewall policies that may be non-persistent local firewall policies which are retained only while the computing device is in operation. It should be understood that, by way of example only and not to limit the scope of the invention, the domain administrator and/or the user may set a firewall policy for the application by allowing or blocking the application, specifying any rules and/or parameters of the rules applied to the application, or by any other actions. Therefore, if one or more previously set firewall policies exist for the application, the domain administrator and/or the user may have previously made a decision regarding the application which may be based on a source of information used to provide a hint.

Figure 4A:
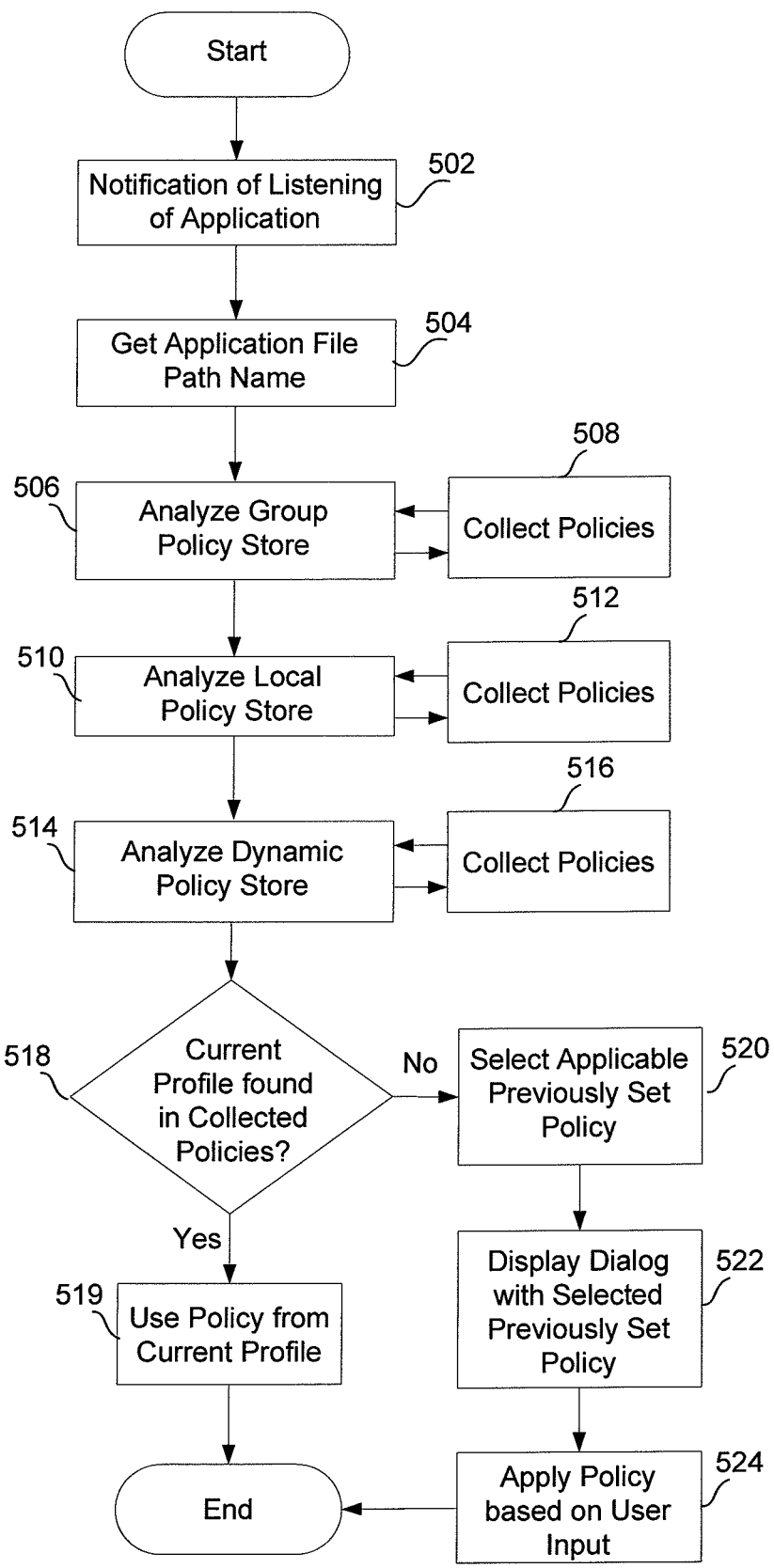
FIGS. 4A-4C are flowcharts illustrating a method of providing hints to a user according to some embodiments of the invention.
Figure 4B:
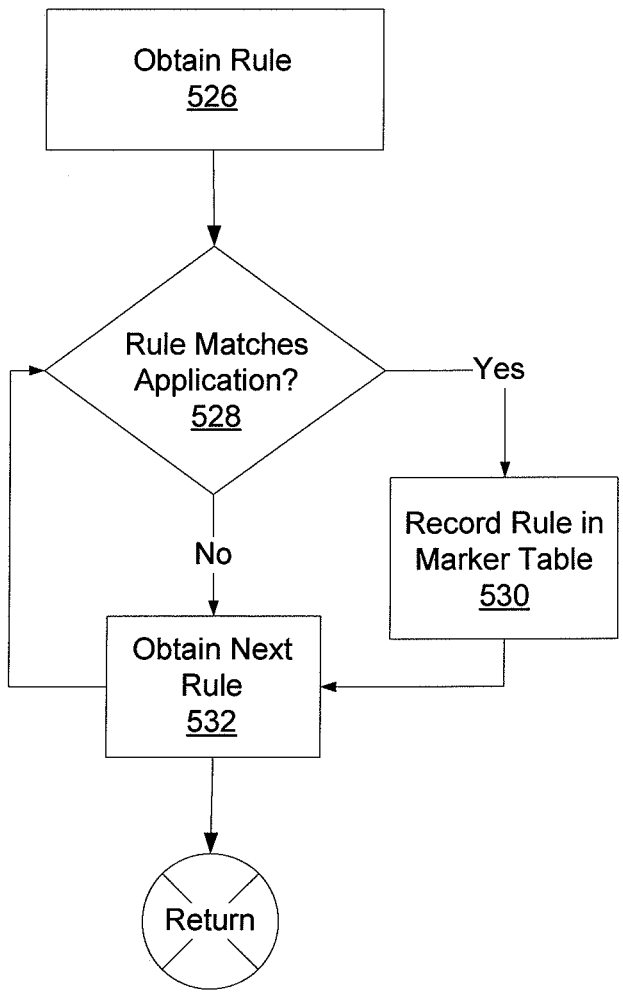
Figure 4C:
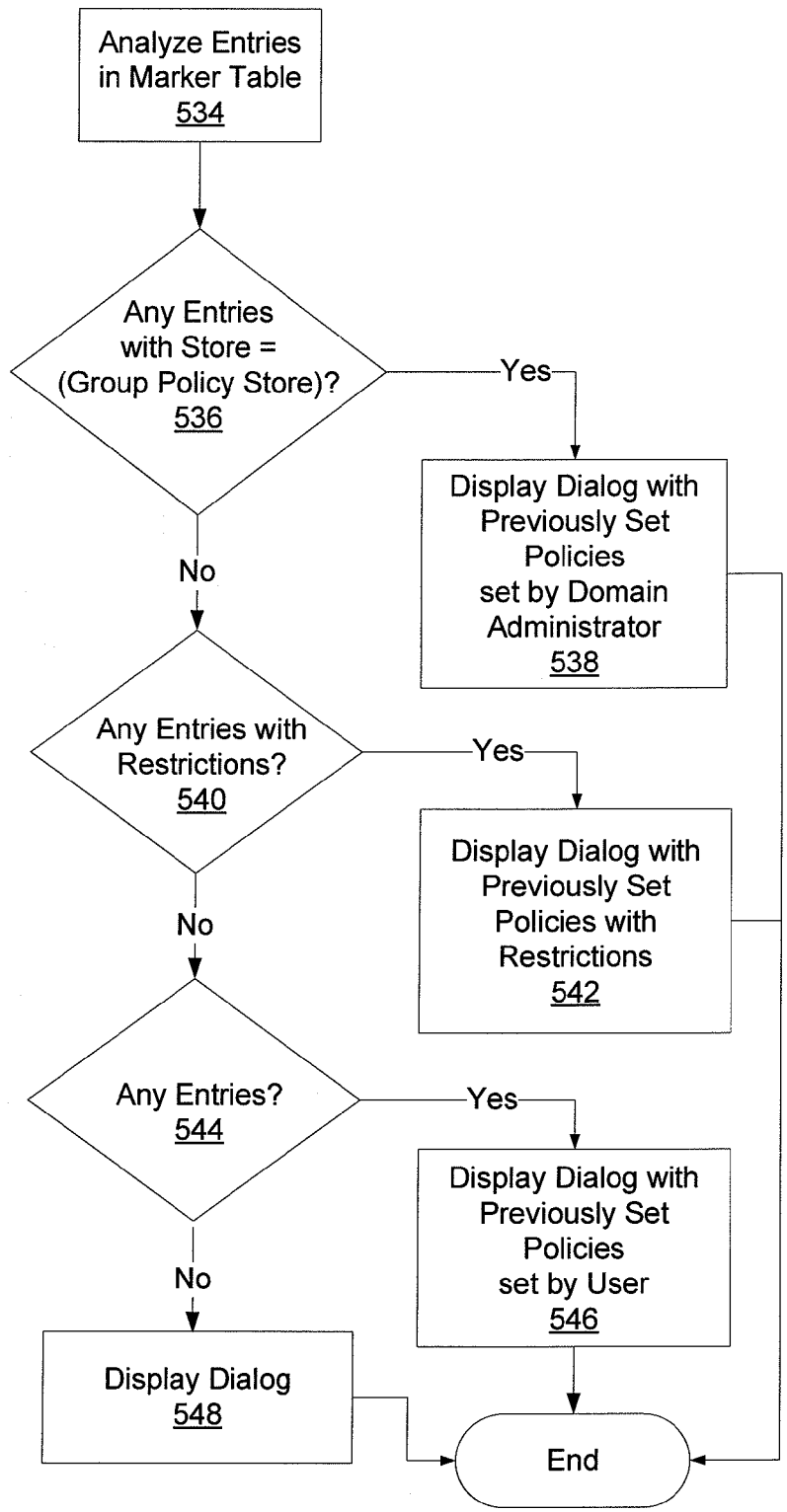

More than one firewall policy previously set for an application in a context different from a current context may exist for an application. Therefore, an applicable firewall policy may need to be selected to provide a hint to a user. For example, because the domain administrator may manage a firewall to protect valuable corporate assets, decisions previously made by the domain administrator regarding an application may take priority over decisions previously made by the user regarding the application. As discussed above, some embodiments of the invention provide a method of determining whether any previously set firewall policies relating to an application exist and presenting information to the user based on the determination. FIGS. 4A-4C include an exemplary illustration of the method that includes prioritization of previously set policies.

As shown in FIG. 4A, the process starts upon an event, for example, starting up an application and/or an access to a network by the application. The application may be any suitable application, for example, an application from the applications 104 executed on the computing device 102 shown in FIG. 1A. In block 502, notification of listening to network traffic (e.g., to a specific port) by the application may be received. The process continues to block 504 where information identifying an application may be obtained. For example, an application file path name may be received. The firewall may resolve the application file path name by consulting a file system in the computing device, whereby the application file path name of the computing device is converted to a normalized file path. The normalized file path can be defined as an absolute path which has "/" removed from the application file path name. It should be noted that block 504 may be optional.

In block 506, a group policy can be analyzed by collecting firewall policies existing for an application from an applicable network profile, as shown in block 508. It should be appreciated that analysis of firewall policies stored in each of the policy stores (e.g., group, local, and/or dynamic) and collection of firewall policies are shown as two separate blocks (for example, blocks 506 and 508) by way of example only and not to limit the scope of the invention. It should be appreciated that, because in embodiments of the invention network profiles have a one-to-one correspondence to firewall profiles, collecting firewall policies may be defined as identifying firewall policies that exist for different network profiles within different policy stores.

FIG. 4B illustrates an example of a process of examining rules in a policy store to collect firewall policies. Accordingly, in block 526, a rule associated with a network profile in a policy store is obtained. The process continues to decision block 528, where it may be determined (e.g., by the firewall 108), whether this rule matches the application (e.g., whether the normalized application file path matches the rule). If the answer is "yes," the process branches to block 530 in which the rule may be recorded in a suitable data structure by adding an entry (e.g., a row) to the data structure. The data structure, an example of which is shown as a data structure 600 in FIG. 5, may be any suitable data structure containing information obtained from policy stores. For example, the data structure 600 may be a marker table. For each rule 620A-620D, the data structure 600 may include information on a corresponding profile 602, store 604, state 606 of the rule (e.g., enabled or disabled), action marker 608 indicating which action (or decision) has been made regarding the application, restrictions 610, and/or any other suitable information 612. In some embodiments, the data structure 600 may be examined to determine whether to request a decision from the user and what type (if any) of information to be provide hints to the user in conjunction with the request.

Returning to the process of collecting policies, illustrative in FIG. 4B, if the answer to the question posed in decision block 528 is "no," the process may branch to block 532 to obtain the next rule. Similarly, after a rule has been recorded in the data structure (e.g., the data structure 600), the next rule may be obtained, in block 532. The process returns when every rule in the policy store has been analyzed.

As illustrated in FIG. 4A, once the group policy store is analyzed, the local policy store may be analyzed and associated profiles may be collected in blocks 510 and 512, respectively. Analogously, the dynamic policy store may be analyzed in block 514 by collecting profiles, in block 516.

After firewall policies for an application included in each of the policy stores have been collected, it may be determined, in decision block 518, whether any of the collected firewall policies was collected from a profile applicable to the current context. This determination provides an indication of whether any previously set firewall policies exist for the application in the current profile. If the answer is affirmative, the firewall applies one or more of the previously set firewall policies to the application, in block 519. In these circumstances, the user may not be presented with a user interface because no decision needs to be requested from the user and the process may terminate. This may simplify the user experience by not distracting the user when a user input is not required. However, it should be appreciated that, in some embodiments, a user may be presented with a user interface informing the user of the firewall policy being applied to the application.

If it has been determined in block 518 that none of the collected firewall policies was collected from a profile applicable to the current context, previously set firewall policies, which may be located, for example, in the data structure 600, may be analyzed to select applicable previously set firewall policies to be used to provide a "hint" to the user. The information may be, for example, the hints 320 shown in FIGS. 2A-2C. The information may be helpful if the user is requested to make a decision regarding the application. Thus, the user may be able to make a more informed decision when presented with the information, which improves user experience and may help mitigate security threats. The applicable previously set firewall policies may be selected depending on certain factors, as discussed below with reference to FIG. 4C.

In block 522, one or more of the selected previously set firewall policies may be presented to the user via a user interface. Thus, a dialog (e.g., the dialog box 302) may be presented to the user displaying the policies selected in block 520, in any suitable format. The user interface may then obtain from the user a decision as a user input, upon which the process may proceed to block 524, where a firewall policy based on the user input may be applied to the application. This firewall policy may be recorded in a location within a policy store (e.g., a local or dynamic policy store) for firewall policies for a current context. The process may then terminate.

As discussed above, multiple firewall policies may exist for an application in contexts different from a current context. Therefore, applicable firewall policies may be selected to obtain information used to provide hints to a user. In some embodiments, firewall policies based on decisions made by a domain administrator may take priority over firewall policies based on decisions made by a user. In block 520 of FIG. 4A, a data structure containing data on previously set firewall policies, such as, for example, the data structure 600, may be analyzed to derive information used to provide hints to the user in conjunction with requesting a decision from the user. An example of the process of prioritizing rules according to some embodiments is illustrated in a flowchart of FIG. 4C. Accordingly, entries in the data structure may be analyzed, in block 534. It should be appreciated that the entries may be analyzed one-by-one, which is not shown for the sake of simplicity.

The process may proceed to decision block 536, where it may be determined whether the data structure includes any entries with the store 604 identified as group policy store. A group policy store comprises firewall policies previously set by a domain administrator which take priority over firewall policies previously set by a user. Thus, if the answer is "yes," a dialog may be displayed presenting to the user information based on the firewall policies previously set by the domain administrator.

As discussed above, the information may be presented to the user as the hints 320. A hint may describe prior decisions and/or previously set firewall policies, which can be obtained from prior decisions. The hint may also indicate who has set a policy, what profile the policy applies to, what restrictions are associated with the policy, and any other suitable information. A decision regarding network access may be to allow, block, allow with some restrictions the access, or any other suitable decision.

An example of such a hint may be "This program is unblocked in the private network location by your domain administrator." This information indicates that an administrator managing a domain to which a computing device executing the application is joined has previously set a firewall policy for the application in a private network location (e.g., in the private network profile 408 of the group policy store 402 shown in FIG. 3). This information may help the user to make a more informed decision regarding the application, even though the application may execute on a network different from the domain network for the first time.

If no entries in the data structure include group policy store in the store 604, the process described with reference to FIG. 4C branches to decision block 540, where it may be determined whether there are any entries with restrictions. An entry in the data structure 600 may have restrictions 610, for example, if the application has been previously unblocked but with some limitations. If the answer is "yes," the process continues to block 542, where a dialog is displayed presenting to the user hints based on the firewall policies with restrictions. The process may then terminate. A hint which is presented to the user may be, for example, "This program in unblocked in the private network location, but with additional restrictions." This may cause the user to continue blocking the application until further investigation is performed to understand the restrictions.

Firewall policies previously set for an application in profiles different from the current profile may include different restrictions. Accordingly, some embodiments of the invention may implemented a "strict unblock" mechanism, whereby the application may be unblocked in the current profile while the most secure restrictions apply to the application. In this case, a dialog presented to the user may inform the user of this "unblock."

If no entries with restrictions have been found in the data structure, the process branches to decision block 544, where it is determined whether there are any entries in the data structure including previously set firewall policies for an application. It should be appreciated that such determination of the absence of previously set firewall policies is shown by way of example only and not to limit the scope of the invention. For example, it could be previously or any suitable point determined that the data structure contains to entries. As another example, in this situation, the data structure may not exist at all.

If it has been determined that there are no entries in the data structure including previously set firewall policies, the process continues to block 548 where a dialog is displayed requesting a decision from the user without providing any hints. Alternatively, if there are entries in the data structure, the process branches to block 546, where a dialog is displayed presenting the user with information based on the firewall policies previously set by the user. The process may then terminate.

A hint presented to the user may comprise, for example, the following: "This program is unblocked in the private network location. This program is blocked in the public network location." Hints of this type may allow the user to make an informed decision regarding an application in the current profile based on decisions that the user has previously made in another profiles. For example, if the user has previously blocked an application in the private network profile, it may be reasonable to block the application in the public network profile as well. As another example, if the user has previously allowed the application in the public network profile, the user may be inclined to allow the application in the private network profile.

It should be appreciated that the above dialogs are described by way of example only and not to limit the scope of the invention. Based on determination of which previously set firewall policies exist for an application in contexts different from the current content and depending on other characteristics such as, for example, whether group firewall policies exist for the application, different types of hints may be presented to the user. As discussed above, the hints may be provided in any suitable video, audio, combination thereof, or in other formats.

Figure 6:
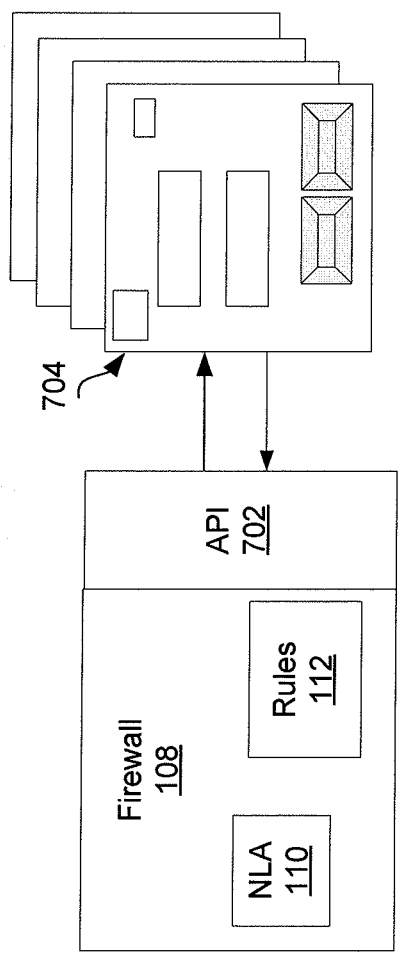
FIG. 6 is a schematic diagram illustrating multiple user interfaces that can be specified by third party applications and provided to the user according to some embodiments of the invention.

In some embodiments, a firewall displays a user interface requesting a decision from a user relating to a firewall policy for an application in conjunction with presenting information to the user based on determination where at least one previously set firewall policy for the application exists in a context different from a current context, with the user interface including a set of arguments. As shown schematically in FIG. 6, the firewall 108 may include or be otherwise associated with an application programming interface (API) 702 via which these arguments may be communicated between the firewall 108 and user interfaces 704.

In some embodiments, applications may interface with a firewall through a command-line interface instead of or in addition to the API 702. Such a command-line interface may receive combinations of a command and arguments specifying a type of a user interface (e.g., a dialog) to generate and to provide "hints" to a user. Table 1 shows an example of arguments that may be provided through command line arguments to create respective dialogs.

TABLE 1

| Arguments | Dialog |
| --- | --- |
| /hint /gp /profile="<profile1>, <profile2>" | Domain Administrator's Choice |
| /hint /restrict /profile="<profile1>, <profile2>" | Unblocked with Restrictions |
| /hint /allow="<profile1>, <profile2>" block="<profile1>, <profile2>" | State Per Profile |

A user interface may be specified in a third party application and be presented to the user to request a decision in conjunction with providing hints to the user based on the determination carried out as described above for embodiments of the invention. Functionality of a firewall implementing embodiments of the invention may thus be extended to allow third parties to utilize hints and display them in user interfaces meaningful for third party applications.

The replaceable dialogs may present information to the user according to embodiments of the invention as described above. Any suitable format may be used to present hints to the user. A replaceable dialog may be provided, for example, by translating entries of a data structure populated by the firewall 108 into a command to launch the dialog specified in a third party application.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device executing an application, the method comprising:
   determining that a firewall policy applicable to the application in a current network context has not been set;
   in response to the determination that the firewall policy applicable to the application in the current network context has not been set, determining that at least one previously set firewall policy is applicable to the application in a network context different from the current network context;
   in response to the determination that the at least one previously set firewall policy is applicable to the application in the network context different from the current network context, presenting information relating to the at least one previously set firewall policy applicable to the application in the network context different from the current network context as at least one hint regarding a firewall policy for the application in the current network context; and in conjunction with presenting the information, prompting for a decision relating to the firewall policy for the application in the current network context.

2. The method of claim 1, wherein the method is initiated upon access to a network.

3. The method of claim 1, wherein the at least one previously set firewall policy comprises at least one enabled policy and/or at least one disabled policy.

4. The method of claim 1, wherein the at least one previously set firewall policy comprises a firewall policy previously set by an administrator and a firewall policy previously set by a user, and wherein presenting the information comprises displaying an indication of the firewall policy previously set by the administrator.

5. The method of claim 1, wherein the network context comprises a network characteristic.

6. The method of claim 1, wherein:
if the at least one previously set firewall policy is a group policy, presenting the information comprises providing information reflecting a prior decision made by an administrator; and
if the at least one previously set firewall policy is not group policy:
if at least one restriction exists that was specified for network context different from the current network context, presenting the information comprises providing information including the at least one restriction; and
if the at least one restriction does not exist, presenting the information comprises providing information based on a prior user decision.

7. The method of claim 1, wherein the at least one previously set firewall policy is a group policy and/or a local policy.

8. The method of claim 7, wherein the at least one previously set firewall policy comprises a policy for a public network profile.

9. The method of claim 7, wherein the at least one previously set firewall policy comprises a policy for a private network profile.

10. The method of claim 1 further comprising receiving through a command line a command specifying a type of a dialog and at least one argument, wherein presenting comprises displaying the dialog based on the command and the at least one argument.

11. A computer system, comprising:
a computer storage medium comprising at least one policy store; and
at least one processor configured to:
determine that a firewall policy applicable an application in a current network context has not been set;
determine that at least one previously set firewall policy applicable to the application in a network context different from the current network context is stored in a policy store;
identify information based on the at least one previously set firewall policy applicable to the application in the network context different from the current network context, the information being related to at least one suggested policy regarding the firewall settings for the application in the current network context; and
present a graphical user interface that includes:
the information related to at least one suggested policy regarding the firewall settings for the application in the current network context; and
a request for a decision regarding firewall settings for the application in the current network context, the request being presented in conjunction with the information.

12. The computer system of claim 11, wherein the information is provided to the user in a video and/or audio format.

13. The computer system of claim 11, wherein the network context comprises a network characteristic.

14. The computer system of claim 11, wherein the graphical user interface comprises a dialog box provided upon access to a network.

15. A computer-readable storage medium encoded with computer-executable instructions that, when executed by at least one processor, implement components comprising:
a policy store;
a firewall component; and
a component that:
determines that a firewall policy applicable an application in a current network context has not been set;
determines that at least one previously set firewall policy applicable to the application in a network context different from the current network context is stored in the policy store;
identifies information based on the at least one previously set firewall policy applicable to the application in the network context different from the current network context, the information being related to at least one suggested policy regarding the firewall settings for the application in the current network context; and
presents a graphical user interface that includes:
the information related to at least one suggested policy regarding the firewall settings for the application in the current network context.

16. The computer-readable storage medium of claim 15, wherein the policy store comprises at least one of a local policy store, a dynamic policy store, and/or a group policy store.

17. The computer-readable storage medium of claim 16, further comprising a network location awareness component, wherein the current network context is derived from information provided by the network location awareness component.

18. The computer-readable storage medium of claim 15, wherein the at least one previously set firewall policy comprises a firewall policy previously set by an administrator and a firewall policy previously set by a user, and wherein the firewall policy previously set by the administrator takes priority over the firewall policy previously set by the user.

19. The computer-readable storage medium of claim 15, further comprising an application programming interface providing communication between the computer-executable components and a third party application whereby the information is provided in conjunction with requesting a decision via an interface specified in the third party application.

20. The method of claim 1, wherein determining that the at least one previously set firewall policy is applicable to the application in the network context different from the current network context comprises accessing at least one network profile of a plurality of network profiles, wherein each network profile of the plurality of network profiles comprises at least one firewall policy applicable in a corresponding network context.

* * * * *